US012792784B2

(12) United States Patent
Rozentsvaig et al.

(10) Patent No.: US 12,792,784 B2
(45) Date of Patent: Nov. 10, 2026

(54) SECURE HARDWARE CALIBRATION

(71) Applicant: Microsoft Technology Licensing, LLC, Redmond, WA (US)

(72) Inventors: Ofer Rozentsvaig, Haifa (IL); Shmuel Kaufman Fridman, Tel-Aviv (IL); Roei Shlomo Menashof, Netanya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 122 days.

(21) Appl. No.: 18/677,121

(22) Filed: May 29, 2024

(65) Prior Publication Data

US 2025/0371198 A1 Dec. 4, 2025

(51) Int. Cl.
*G06F 21/73* (2013.01)
*G06F 21/57* (2013.01)

(52) U.S. Cl.
CPC ............ *G06F 21/73* (2013.01); *G06F 21/575* (2013.01); *G06F 2221/034* (2013.01)

(58) Field of Classification Search
CPC ........ G06F 21/50; G06F 21/572; G06F 21/73; G06F 2201/034; G06F 8/65
See application file for complete search history.

(56) References Cited

U.S. PATENT DOCUMENTS

| | | | | |
|---|---|---|---|---|
| 8,855,620 | B2 * | 10/2014 | Sievers | H04L 63/083 709/219 |
| 9,542,558 | B2 * | 1/2017 | Mensch | H04L 9/3247 |
| 10,191,729 | B2 * | 1/2019 | Lee-Baron | G06F 8/61 |
| 2010/0199078 | A1 * | 8/2010 | Shih | G06F 8/65 717/173 |
| 2022/0201468 | A1 * | 6/2022 | Reshef | G06F 21/572 |

* cited by examiner

*Primary Examiner* — Daniel B Potratz
(74) *Attorney, Agent, or Firm* — Shook Hardy & Bacon L.L.P.

(57) ABSTRACT

The technology described herein relates to securely updating factory calibration data. Currently, factory calibration data may be stored in a secure memory during the build process. By design, many computing systems do not allow the factory calibration data to be altered or replaced. The technology described herein allows the factory calibration to be updated securely when equipment is replaced. Security for the calibration update is provided by requiring two conditions to be met before calibration settings are updated. The first condition is that a calibration update status (e.g., flag) is changed to active. The second condition is that a new hardware component has been added to the computing device.

19 Claims, 5 Drawing Sheets

SECURE HARDWARE CALIBRATION

CROSS-REFERENCE TO RELATED APPLICATIONS

None.

BACKGROUND

Various computer hardware components are calibrated in the factory when the computer is built. The calibration may be used to initially set values of various firmware attributes. Different components require different tools and calibration processes. The calibration of screens primarily involves adjusting the color coordinates and brightness levels. This process may be automated and uses colorimeters to measure and adjust the color output of the screen. The goal is to ensure that the colors displayed on the screen are as close as possible to the original source or industry standards.

Camera calibration in the factory involves adjusting the focus, exposure, white balance, and color accuracy. This is often done using a series of test images and patterns under controlled lighting conditions. The camera's firmware is then adjusted based on these tests to ensure optimal performance.

Microphone calibration involves adjusting the sensitivity and frequency response of the microphone. This may be done using a reference sound source in an anechoic chamber (a room designed to completely absorb reflections of sound). The microphone's output is compared to the known output of the reference source, and adjustments are made as necessary.

Once calibrated, the settings may be saved in a way that makes update to the settings challenging. Current security methods governing setting changes can prevent a second (or non-factory) calibration. This inability to update settings can make replacing different hardware components, even with replacements in kind, difficult because calibration of the new component is prevented. This means the new component may be forced to operate based on the calibration parameters of the original component installed at the factory.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technology described herein relates to a method for securely calibrating a device component, such as a sensor, a camera, a microphone, or any other component that requires calibration for optimal performance. The technology described herein allows the calibration to occur in the field and replace "factory" settings. The calibration may involve adjusting parameters, settings, or values related to the component's functionality, accuracy, or quality. The technology described herein provides a solution to prevent unauthorized or malicious calibration of the component by a third party, such as a hacker, a competitor, or a user without proper permissions.

Currently, factory calibration data may be stored in a secure memory during the build process. By design, many computing systems do not allow the factory calibration data to be altered or replaced, except possibly by the manufacture or any authorized repair service that may have special equipment and/or codes that allow the computer to enter a mode not available to the user. Manufactures make the factory calibration data difficult to change because in most cases it should not need to change and providing user access may indirectly provide a hacker access. A hacker could dramatically decrease the functioning of several different devices by deleting or altering calibration data. However, the inability to change calibration data, means that users may not be able to replace broken hardware. For example, if a laptop screen breaks a user could buy and install a new screen, but may not be able update the calibration data already stored for the old screen. This means, without the technology described herein, the new screen would need to operate with the original calibration data, which might not be optimized for the new screen. Some operating systems allow limited user calibration of different devices, but these adjustments may not adjust all of the same parameters and may be more limited. Essentially, the current user calibration may be thought of as a fine tuning. The technology described herein allows the factory calibration to be updated securely when equipment is replaced. The technology prevents the factory calibration data from being changed, except when new equipment is installed in a computing device.

The technology described herein may operate within a boot manager or other application on the computing device. The boot manager or other software may be given write access to the secure memory where the factory calibration data is stored. In examples described herein, the boot manager may be the Unified Extensible Firmware Interface (UEFI), which is a software interface between the operating system and the platform firmware. The UEFI provides a set of variables that can be used to store and retrieve data by the user or the firmware. The technology described herein may leverage two UEFI variables. The first variable may be described as a calibration indicator or flag. The second variable is used to store the calibration data. Both variables may be preexisting UEFI variables that used by the technology described herein for the purposes described herein. Other processes may use them for different purposes during different operations. The flag variable is used to indicate that the user intends to calibrate the component and to authorize the firmware to perform the calibration. In an aspect, setting the first variable or flag variable value to 1 may correspond to an active status, while setting it to 0 may correspond to an inactive status. The calibration data variable is used to store the data payload for the calibration, such as the desired parameters, settings, or values for the component.

Security for the calibration update is provided by requiring two conditions to be met before calibration settings are updated. The first condition is that a calibration update status (e.g., flag) is changed to active. The second condition is that a new hardware component has been added to the computing device. The new hardware component may replace an old hardware component that has broken or is being upgraded. For example, the new hardware component may be a new laptop screen to replace an old laptop screen. The requirement that a new hardware component be installed prevents the calibration parameters from being remotely updated. The calibration update may only be completed by a person with physical control of the computing device, as evidenced by the ability to replace a hardware component.

The technology described herein may read the unique identifier (UID) of the hardware component to verify that new hardware has been installed. The UID is a code or a number that distinguishes the component from other components of the same type or model. The UID may be embedded in the component's hardware, firmware, or software. The UID may be read by the UEFI or the firmware during the boot process or during the device operation.

When the stored UID for the original component does not match the UID of the component newly installed, then the factory calibration data may be updated. The updating can include replacing the old calibration data with new calibration data. Once the update is completed, the UID record may be updated by replacing the old component's UID with the new component's UID. Upon completion of the calibration data update, the calibration update status (e.g., flag) is changed to inactive. In an aspect, the newly installed component may not have a UID. This would still cause a mismatch because "no UID" is a mismatch with any UID. When a newly installed component does not have a UID, the UEFI may create a UID and write it to both the newly installed component and a UEFI variable that is accessible to the UEFI.

BRIEF DESCRIPTION OF THE DRAWINGS

The technology described herein is illustrated by way of example and not limitation in the accompanying figures in which like reference numerals indicate similar elements and in which.

DETAILED DESCRIPTION

Figure 1:
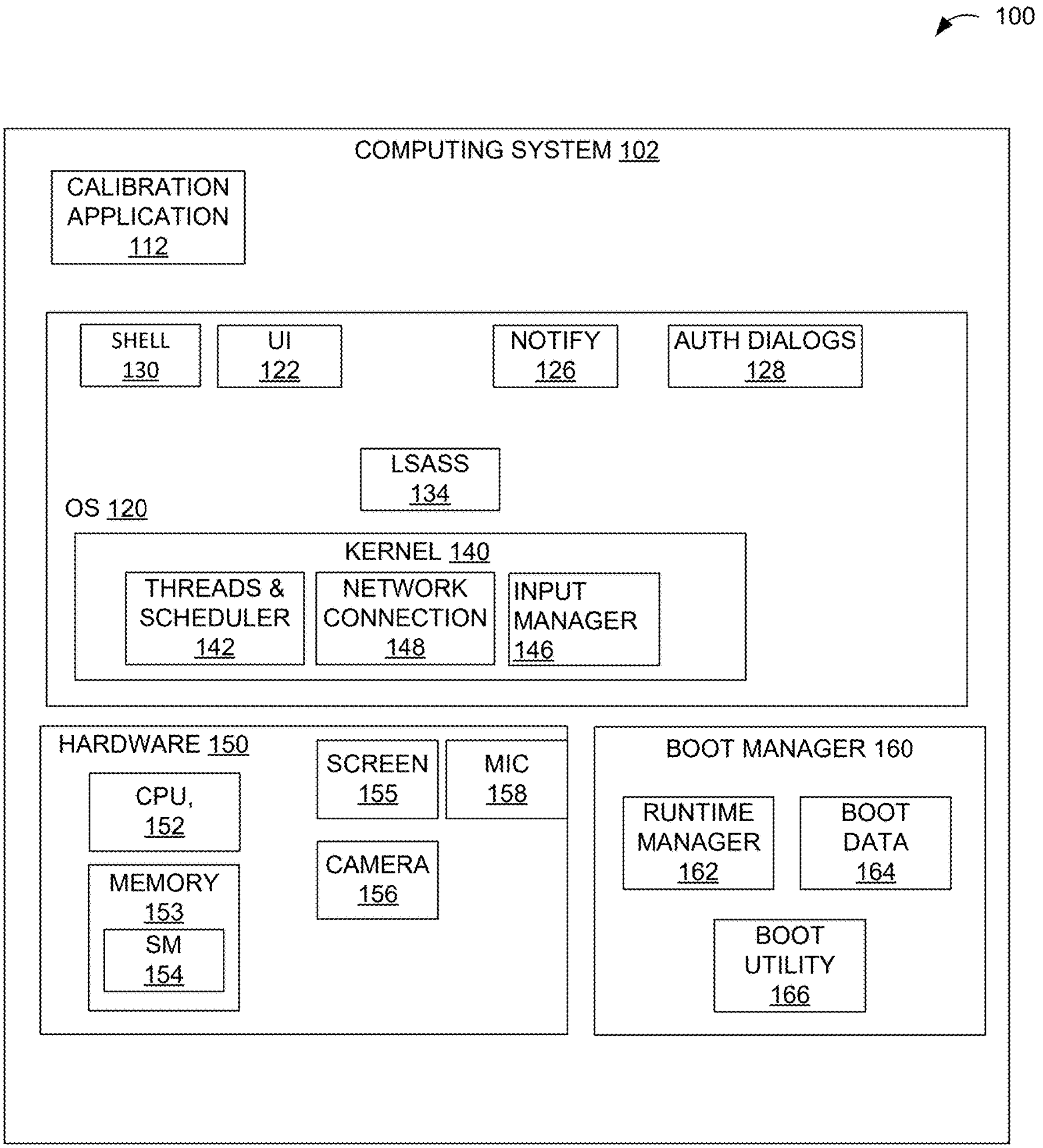
FIG. 1 is a diagram of a computing device suitable for implementations of the technology described herein.

The various technologies described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein relates to a method for securely calibrating a device component, such as a sensor, a camera, a microphone, or any other component that requires calibration for optimal performance. The technology described herein allows the calibration to occur in the field and replace "factory" settings. The calibration may involve adjusting parameters, settings, or values related to the component's functionality, accuracy, or quality. The technology described herein provides a solution to prevent unauthorized or malicious calibration of the component by a third party, such as a hacker, a competitor, or a user without proper permissions.

Currently, factory calibration data may be stored in a secure memory during the build process. By design, many computing systems do not allow the factory calibration data to be altered or replaced, except possibly by the manufacture or any authorized repair service that may have special equipment and/or codes that allow the computer to enter a mode not available to the user. Manufactures make the factory calibration data difficult to change because in most cases it should not need to change and providing user access may indirectly provide a hacker access. A hacker could dramatically decrease the functioning of several different devices, or even make device unusable, by deleting or altering calibration data. However, the inability to change calibration data, means that users may not be able to replace broken hardware. For example, if a laptop screen breaks a user could buy and install a new screen, but may not be able update the calibration data already stored for the old screen. This means, without the technology described herein, the new screen would need to operate with the original calibration data, which might not be optimized for the new screen. Some operating systems allow limited user calibration of different devices, but these adjustments may not adjust all of the same parameters and may be more limited. Essentially, the current user calibration may be thought of as a fine tuning. The technology described herein allows the factory calibration to be updated securely when equipment is replaced. The technology prevents the factory calibration data from being changed, except when new equipment is installed in a computing device.

While the technology described herein is not limited to screens, screens will be the primary component used as an example throughout this application. Hardware that could be replaced and require calibration using the technology described herein includes, but is not limited to, a screen, a camera, a microphone, an inertial motion sensor (IMU), security devices (e.g., fingerprint reader), touch pad, trackball, keyboard, and the like. During the manufacturing process, laptop screens undergo a process known as factory calibration. This involves performing a large number of measurements of different colors at various values on the display. These measurements are used to characterize the response of the display. The calibration process includes adjusting parameters such as brightness, gamma, color temperature, and uniformity on the panel. For example, under a specific lightbulb light the color sensor should display values of: RGB=100,132,200 (for example). The calibration process can ensure a device displays those values under that lightbulb (which has its own intensity and light scheme). It also involves calibrating factory preset modes, such as "AdobeRGB," "sRGB," "DCI-P3," etc. The calibration data is stored in a specially designed memory block that may only be accessed by specialized equipment in the factory. This data may be saved as an ICC (International Color Consortium) profile. On WINDOWS systems, for example, the ICC profile gets saved under C:\Windows\System32\spool\drivers\color, as a .icc stamped file with the date calibration occurred.

In some cases, the operating system reads the color management setup on the computer, and instructs the graphics processing chip inside the computer to send specific instructions to the display. The display then renders the colors, adjusting the saturation, color intensity, and brightness accordingly. The software removes any color casts and optimizes the settings. These "correct" settings are loaded each time the system reboots. If the monitor uses look-up-tables, these profiles can be stored in the monitor itself.

The technology described herein may operate within a boot manager or other application on the computing device. The boot manager or other software may be given write access to the secure memory where the factory calibration data is stored. In examples described herein, the boot manager may be the Unified Extensible Firmware Interface (UEFI), which is a software interface between the operating system and the platform firmware. The UEFI provides a set of variables that can be used to store and retrieve data by the user or the firmware. The technology described herein may leverage two UEFI variables. The first variable may be described as a calibration indicator or flag. The second variable is used to store the calibration data. Both variables may be preexisting UEFI variables that used by the technology described herein for the purposes described herein. Other processes may use them for different purposes during different operations. The flag variable is used to indicate that the user intends to calibrate the component and to authorize the firmware to perform the calibration. In an aspect, setting the first variable or flag variable value to 1 may correspond to an active status, while setting it to 0 may correspond to an inactive status. The calibration data variable is used to store the data payload for the calibration, such as the desired parameters, settings, or values for the component.

Security for the calibration update is provided by requiring two conditions to be met before calibration settings are updated. The first condition is that a calibration update status (e.g., flag) is changed to active. The second condition is that a new hardware component has been added to the computing device. The new hardware component may replace an old hardware component that has broken or is being upgraded. For example, the new hardware component may be a new laptop screen to replace an old laptop screen. The requirement that a new hardware component be installed prevents the calibration parameters from being remotely updated. The calibration update may only be completed by a person with physical control of the computing device, as evidenced by the ability to replace a hardware component.

The technology described herein may read the unique identifier (UID) of the hardware component to verify that new hardware has been installed. The UID is a code or a number that distinguishes the component from other components of the same type or model. The UID may be embedded in the component's hardware, firmware, or software. The UID may be read by the UEFI or the firmware during the boot process or during the device operation.

When the stored UID for the original component does not match the UID of the component newly installed, then the factory calibration data may be updated. The updating can include replacing the old calibration data with new calibration data. Once the update is completed, the UID record may be updated by replacing the old component's UID with the new component's UID. Upon completion of the calibration data update, the calibration update status (e.g., flag) is changed to inactive. In an aspect, the newly installed component may not have a UID. This would still cause a mismatch because "no UID" is a mismatch with any UID. When a newly installed component does not have a UID, the UEFI may create a UID and write it to both the newly installed component and a UEFI variable that is accessible to the UEFI.

On boot, UEFI look for UID on the device. If the UEFI doesn't find a UID on the device: This means that this is a new component. The UEFI generates a new unique UID. It stores it in the newly installed component AND in a secure variable only accessible by UEFI. If the UEFI finds a UID which is different from the one UEFI stored for itself. This means this is a newly installed component on this computer (the newly installed component may have been used on another device). In an aspect where in the UID on the device may be updated, the UEFI may generate a new UID and store it in a secure variable and on the device. If the UEFI finds a UID that is identical to the one it have stored, then the UEFI determines that the component was not replaced.

The technologies herein are described using key terms wherein definitions are provided. However, the definitions of key terms are not intended to limit the scope of the technologies described herein.

A boot manager manages the boot process of modern computers. The UEFI (Unified Extensible Firmware Interface) boot manager is one example of a boot manager, which plays a central role in determining how the system boots. The UEFI boot manager is a firmware policy engine that configures the boot process by modifying global NVRAM (non-volatile RAM) variables. It attempts to load UEFI drivers and applications (including OS boot loaders) in an order defined by these variables. The boot sequence involves reading the boot order list from NVRAM, which contains information about what to boot. Each entry in the list specifies a boot option, the hardware device, and the UEFI image file to load. The NVRAM can also hold load options passed directly to the UEFI image. If booting fails, the boot manager may take value-added actions, such as retrying or booting to a diagnostic environment. WINDOWS Boot Manager is a UEFI application provided by MICROSOFT. It connects the firmware to the operating system, managing the boot environment and loading necessary components before the OS boots.

NVRAM is used in EFI (Extensible Firmware Interface) to store variables that persist between boots. These variables are architecturally defined and can impact boot behavior. Each NVRAM variable defines a boot option name. It also contains a pointer to the hardware device and a file on that device containing the UEFI image to be loaded during boot.

Firmware is a type of software that provides low-level control for a device's specific hardware. It can be thought of as the software that directly interfaces with and controls the hardware of a device. Firmware may be stored in the read-only memory (ROM) of a hardware device, such as the BIOS of a computer, or the EEPROM of an embedded system. It can be upgraded or updated through a process known as flashing. Firmware initializes the hardware and has the capability to interact directly with it. It's responsible for things like starting up the device, managing system resources, and facilitating communication between the hardware and software of a device. Firmware may be hardware-specific and provides the basic functionality of the hardware.

A device driver is a type of software that acts as a translator between the hardware and the operating system or other software. It allows the operating system and other software to interact with the hardware without needing to know the technical details of the hardware. Device drivers are usually specific to an operating system and must be updated separately from the operating system and firmware. Device drivers provide a way for other software (like operating systems) to use the hardware without needing to understand the hardware specifics.

During the camera calibration process, several parameters are measured to ensure accurate and consistent image capture. The parameters include intrinsic parameters, such as focal length, optical length, skew, and pixel aspects ratio. Intrinsic parameters are specific to the camera and lens system. Focal length is distance between the lens and the image sensor. Optical center, also known as the principal point, is the point on the image plane to which rays parallel to the optical axis converge. Skew describes the angle between the x and y pixel axes. Pixel aspect ratio is the ratio of the width to the height of a pixel.

The camera calibration parameters also include extrinsic parameters, such as rotation, translation, distortion coefficients, radial distortion, and tangential distortion. Extrinsic parameters represent the camera's position in the 3-D scene. Rotation is the orientation of the camera in relation to the scene. Translation is the position of the camera's optical center in world coordinates. Distortion coefficients are parameters that account for lens distortion, which can cause straight lines to appear curved in images. There are two main types of distortion. Radial distortion causes straight lines to curve towards or away from the center of the image. Tangential distortion occurs when the lens and the image plane are not parallel.

Using the extrinsic and intrinsic parameters, the calibration algorithm computes the camera matrix. This matrix is used to map 3D world points to 2D image points. These parameters are estimated using images that contain a calibration pattern, such as a checkerboard. The calibration process ensures that the camera accurately captures the colors and details of the scene. The camera parameters may be saved in an .icc file.

During the manufacturing process, microphones undergo a process known as factory calibration. This involves performing a large number of measurements of different sounds at various values. These measurements are used to characterize the response of the microphone. The calibration process includes adjusting parameters such as sensitivity, frequency response, and uniformity. The calibration data is stored in a specially designed memory block that can only be accessed by specialized equipment in the factory. This data may be saved as a profile.

The operating system reads the calibration setup on the computer, and instructs the audio processing chip inside the computer to send specific instructions to the microphone. The microphone then captures the sounds, adjusting the sensitivity, frequency response, and uniformity accordingly. The software removes any noise and optimizes the system settings. These "correct" settings are loaded each time the computing system reboots During the manufacturing process, calibration of an Inertial Measurement Unit (IMU) may be performed. Calibration helps in improving the accuracy of the sensor readings. It mainly involves static calibration and dynamic calibration. Static calibration is used to evaluate the zero bias and scale factor error of the IMU. The zero bias is the output of the sensor when it should be zero, and the scale factor error is the difference between the actual and expected output for a given input. Dynamic calibration is used to evaluate the nonlinear error and coupling error of the IMU. Nonlinear error refers to the deviation of the sensor's output from a straight line when plotted against the input, while coupling error refers to the influence of one sensor axis on another. The exact calibration process can vary depending on the specific model of the IMU and the device it's connected to.

Having briefly described an overview of aspects of the technology described herein, an operating environment in which aspects of the technology described herein may be implemented is described below in order to provide a general context for various aspects.

Turning now to FIG. 1, a block diagram is provided showing an example operating environment 100 in which some embodiments of the present disclosure can be employed. It should be understood that this and other arrangements described herein are set forth only as examples. Other arrangements and elements (for example, machines, interfaces, functions, orders, and groupings of functions) can be used in addition to or instead of those shown, and some elements can be omitted altogether for the sake of clarity. Further, many of the elements described herein are functional entities that are implemented as discrete or distributed components or in conjunction with other components, and in any suitable combination and location. Various functions described herein as being performed by one or more entities are carried out by hardware, firmware, and/or software. For instance, some functions are carried out by a processor executing instructions stored in memory.

Among other components not shown, example operating environment 100 includes a computing system 102. The computing system 102 may be described as client devices, a computer, user device, edge devices, and/or untrusted devices herein. In aspects, computing system 102 may comprise any type of computing device capable of use by a user. For example, in one aspect, computing system 102 is the type of computing device 500 described in relation to FIG. 5. By way of example and not limitation, a computing system 102 may be embodied as a personal computer (PC), a laptop computer, a mobile device, a smartphone, a tablet computer, a virtual-reality (VR) or augmented-reality (AR) device or headset, a handheld communication device, an embedded system controller, a consumer electronic device, a workstation, any other suitable computer device, or any combination of these delineated devices.

The environment 100 represents only one example of a suitable computing device architecture. Other arrangements and elements can be used in addition to or instead of those shown, and some elements may be omitted altogether for the sake of clarity. These components may be embodied as a set of compiled computer instructions or functions, program modules, computer software services, or an arrangement of processes carried out on one or more computing devices.

In one embodiment, the functions performed by components of environment 100 are associated with training and using a machine-learning model. These components, functions performed by these components, and/or services carried out by these components may be implemented at appropriate abstraction layer(s) such as the operating system layer, application layer, and/or hardware layer of the computing device(s). Alternatively, or in addition, the functionality of these components, and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example environment 100, it is contemplated that in some embodiments functionality of these components can be shared or distributed across other components and/or computing devices.

The computing system 102 includes an operating system 120 and a hardware layer 150. The hardware layer 150 is the physical layer of a computer or user device. It consists of the actual electronic components and devices that make up the computer, such as the CPU, memory, disk drives, keyboard, mouse, display screen, etc. The hardware layer 150 is responsible for executing the low-level instructions and operations that are necessary for the functioning of the computer.

Example environment 100 provides a detailed view of the computing system 102, including an operating system 120, hardware layer 150, a calibration application 112. Together with components not shown, the operating system 120 components may be described as an operating system. These components may be embodied as a set of compiled computer instructions or functions, program modules, computer software services, or an arrangement of processes carried out on one or more computer systems. The operating system 120 sits directly above the hardware layer 150. The operating system 120 is software that manages the hardware resources of a computer and provides various services for computer programs. It acts as an intermediary between the user's applications and the computer hardware. Key functions of the operating system include managing the computer's memory, controlling input and output devices, managing files and directories on the disk, and providing a user interface. The operating system layer abstracts the complexities of the hardware layer, providing a consistent and user-friendly interface for applications to interact with the hardware. This allows application developers to focus on the logic of their applications without worrying about the specifics of the underlying hardware.

The hardware layer 150 comprises one or more central processing units (CPUs), memory 153, and secure memory 154, a screen 155, a camera 156, and a microphone 158. The secure memory 154 stores calibration data, including factory calibration data, for a hardware component such as the screen 155, a camera 156, and a microphone 158. During the boot process, the calibration data may be read by firmware, or some other component, and provided to the operating system process responsible for using the hardware's data.

The boot manager 160 includes a runtime manager 162, boot data 164, and a boot utility 166. The technology described herein may operate within a boot manager 160 or calibration application 112 on the computing system 102. The boot manager 160 may be given write access to the secure memory 154 where the factory calibration data is stored. In examples described herein, the boot manager 160 may be the Unified Extensible Firmware Interface (UEFI), which is a software interface between the operating system and the platform firmware.

The calibration indicator may be set through a boot utility 166 interface. The calibration indicator may be a flag in a designated field of the software, such as a UEFI shell, a UEFI application, or a UEFI utility, performing the data update. Initially, a user sets the calibration indicator to a predetermined value, such as 1. The calibration indicator may be a NVRAM variable and included in boot data 164. The calibration indicator acts as a signal for the UEFI and the firmware associated with the hardware component being replaced that the user wants to calibrate the component and has the necessary permissions to do so.

The user associates the calibration data variable, which may be a NVRAM variable, in the software performing the update with the data payload for the calibration, such as the desired parameters, settings, or values for the component. Again, the calibration data may be provided through a user interface associated with the boot utility 166. The calibration data variable may have a predefined name, format, or size, or may be specified by the user. The calibration data variable may be encrypted, signed, or authenticated by the user or the UEFI to ensure its integrity and validity.

The operating system 120 components include kernel 140 components. Many components of the operating system, such as a hardware abstraction layer between the hardware layer 150 and the kernel 140 components, are not shown. The kernel 140, of which the kernel components 142, 146, and 148 are a part, is a computer program at the core of a computer's operating system and has control over the system. The kernel 140 facilitates interactions between hardware and software components. The kernel 140 controls hardware resources (e.g., input/output (I/O), memory) via device drivers, arbitrates conflicts between processes concerning such resources, and optimizes the utilization of common resources (e.g., CPU, memory, and storage 152). On some systems, the kernel 140 is one of the first programs loaded on startup (after the bootloader). Once loaded, the kernel 140 may handle the rest of startup as well as memory, peripherals, and I/O requests from software, translating them into data-processing instructions for the CPU.

The code of the kernel 140 may be loaded into a separate area of memory, which is protected from access by application software or other, less critical parts of the operating system. The kernel 140 performs its tasks, such as running processes, managing hardware devices such as the hard disk, and handling interrupts, in this protected kernel space. This separation helps prevent user data and kernel data from interfering with each other and causing instability and slowness, as well as preventing malfunctioning applications from affecting other applications or crashing the entire operating system.

When a user-mode application starts, the operating system creates a process for the application. The process provides the application with a private virtual address space and a private handle table. Because an application's virtual address space is private, one application cannot alter data that belongs to another application. In addition to being private, the virtual address space of a user-mode application is limited. A processor running in user mode cannot access virtual addresses that are reserved for the operating system. Limiting the virtual address space of a user-mode application prevents the application from viewing, altering, and possibly damaging, critical operating system data.

The kernel 140 components include a thread manager and scheduler 142, an input manager 146, and a network connection manager 148. An operating system kernel may include additional components. The thread manager and scheduler 142 handles the execution of threads in a process. An instance of a program runs in a process. Every process has an ID, a number that identifies it. A thread is a schedulable entity within a process, a stream of execution within a process.

The input manager 146 facilitates hardware input. A computer consists of various devices that provide I/O to and from the outside world. Typical devices are keyboards, mice, audio controllers, video controllers, disk drives, networking ports, and so on. Device drivers provide the software connection between the devices and the operating system. The input manager 146 manages the communication between applications and the interfaces provided by device drivers. The input manager 146 may determine or have access to the control focus of the operating system.

The operating system 120 components may reside outside of the kernel and comprise a Local Security Authority Subsystem Service (LSASS) 134. Other operating system components are omitted from FIG. 2 for the sake of simplicity. The LSASS 134 is responsible for enforcing the security policy on the system. It verifies users logging on to a computer or server, handles password changes, and creates access tokens. The LSASS may provide stored credentials or secrets to other components described herein. The LSASS may perform authentication functions when calibration data is provided for update and before it is saved as a variable for upload during a subsequent boot cycle.

The shell 130 is the portion of the operating system that allows the user to communicate with the operating system 120, including the kernel 140. The operating system 120 also comprises components, such as user interface component 122, notification component 126, and authorization dialogs 128. The user interface component 122 provides the operating system's main user interface. The clipboard 124 is an interface feature that may capture objects (e.g., files, text, images) in the operating system user interface and/or application interfaces and perform an operation on the captured object (e.g., copy, cut, move). The notification component 126 manages notifications provided through the operating system. The notifications may originate from an application or service, such as an email application or social media service. The authorization dialog 128 allows the user to provide and/or confirm information that is used to authenticate the user to various entities and components. The authorization component may confirm that an authorized user is providing calibration data or setting a calibration variable to active.

Example Methods

Figure 2:
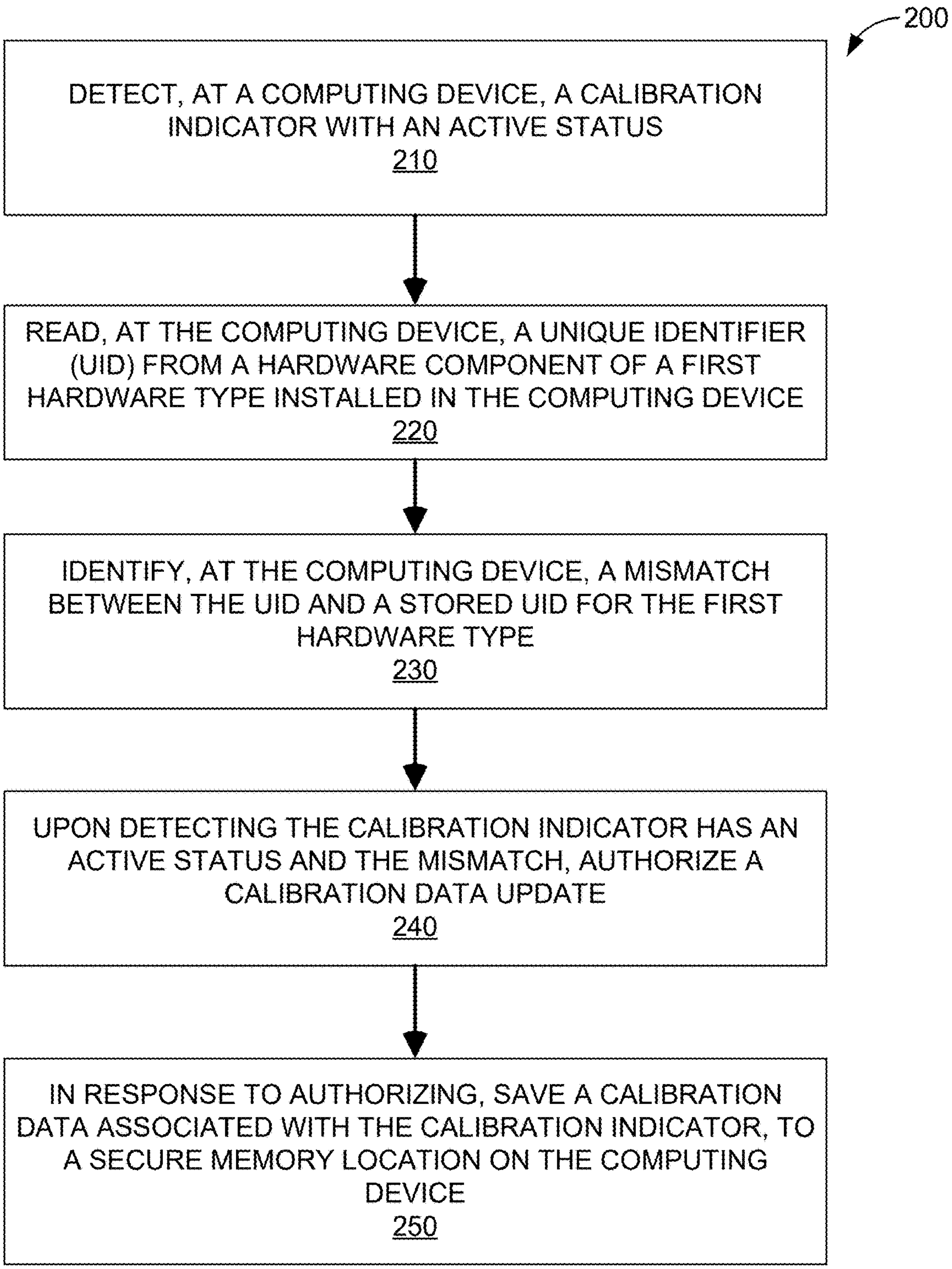
FIG. 2 is a flow diagram showing a method of providing calibration data for a hardware component of a computing device, in accordance with an aspect of the technology described herein.
Figure 3:
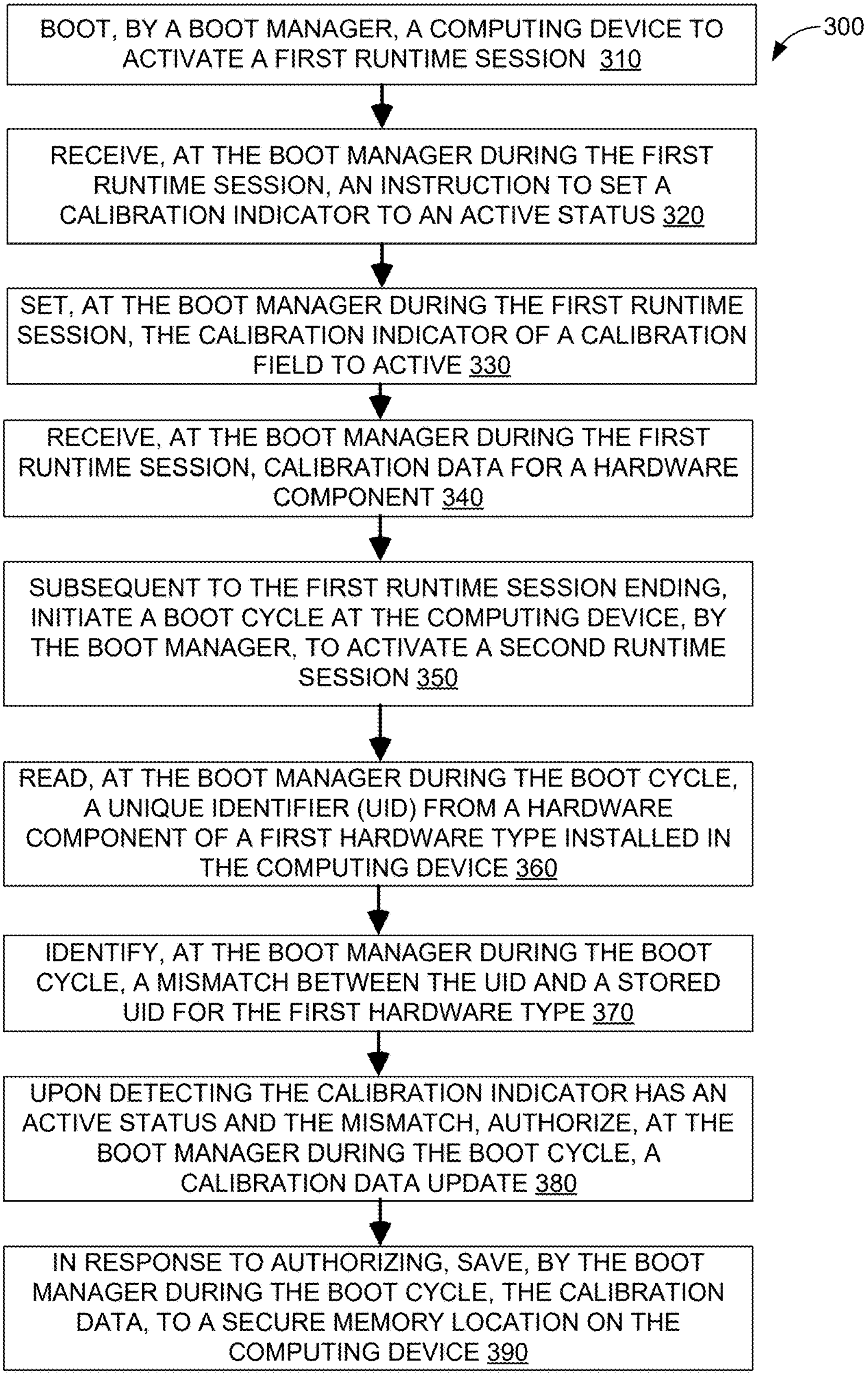
FIG. 3 is a flow diagram showing a method of providing calibration data for a hardware component of a computing device, in accordance with an aspect of the technology described herein.
Figure 4:
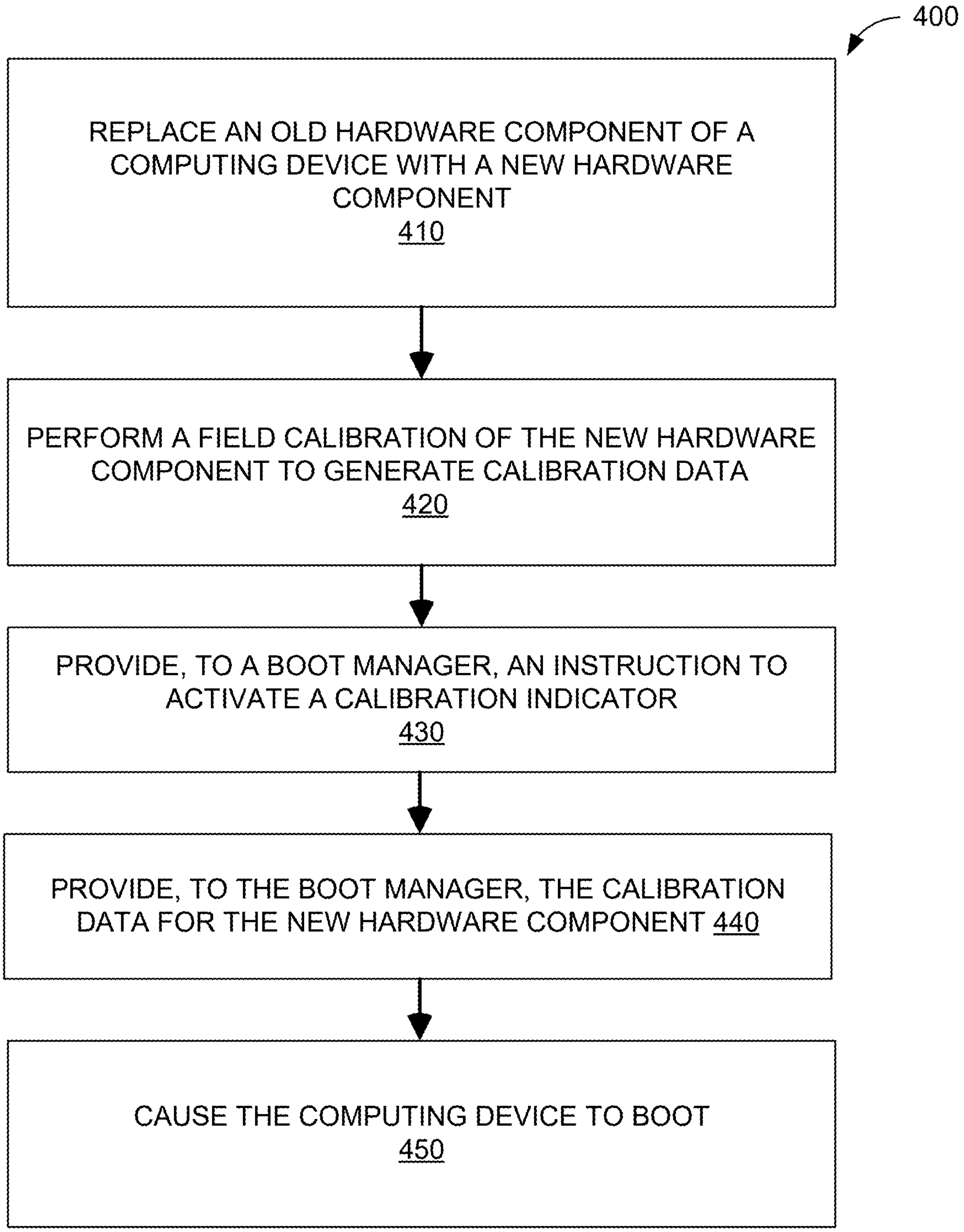
FIG. 4 is a flow diagram showing a method of providing calibration data for a hardware component of a computing device, in accordance with an aspect of the technology described herein.

Now referring to FIGS. 2, 3 and 4, each block of methods 200, 300, and 400, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by an operating system. In addition, methods 200, 300, and 400 are described, by way of example, with respect to FIG. 1. However, these methods may additionally or alternatively be executed by any one system, or any combination of systems, including, but not limited to, those described herein.

FIG. 2 is a flow diagram showing a method 200 of providing calibration data for a hardware component to a computing device. The technology described herein provides a secure device calibration method that comprises a series of steps. At step 210, the method includes detecting, at a computing device, a calibration indicator with an active status. The calibration indicator may be a flag in a designated field of the software, such as a UEFI shell, a UEFI application, or a UEFI utility, performing the data update. Initially, a user sets the flag variable to a predetermined value, such as 1. The calibration indicator may be a NVRAM variable. The calibration indicator acts as a signal for the UEFI and the firmware associated with the hardware component being replaced that the user wants to calibrate the component and has the necessary permissions to do so.

Next, the user assocaites the calibration data variable, which may be a NVRAM variable, in the software performing the update with the data payload for the calibration, such as the desired parameters, settings, or values for the component. The calibration data variable may have a predefined name, format, or size, or may be specified by the user. The calibration data variable may be encrypted, signed, or authenticated by the user or the UEFI to ensure its integrity and validity.

The user replaces the hardware component with a new one that has a different UID from the previous one. The user may use a physical tool, such as a screwdriver, a plier, or a soldering iron, to remove the old component and install the new one. The user may also use a software tool, such as a firmware update utility, to change the UID of the component without physically replacing it. Next, the user resets the device, such as by pressing a reset button, unplugging and plugging the power cord, or issuing a reboot command. The device initiates the boot process and loads the UEFI.

At step 220, the method includes reading, at the computing device, a unique identifier (UID) from a hardware component of a first hardware type installed in the computing device. The UEFI reads the UID of the component and compares it with the stored UID that corresponds to the previous component. Alternatively, the UID may be blank. In other words, the hardware is not manufactured with an UID. In this case, the UEFI may generate a UID and write it to the new hardware and store it internally.

At step 230, the method includes identifying, at the computing device, a mismatch between the UID and a stored UID for the first hardware type. The UEFI detects that the component has been replaced by finding a mismatch between the UIDs. A mismatch can be detected when no UID is found and a stored UID exists. A mismatch can also be found when a UID is found and it does not match the stored UID.

At step 240, the method includes, upon detecting the calibration indicator has an active status and the mismatch, authorizing a calibration data update. The UEFI checks the value of the calibration indicator (e.g., flag variable) and verifies that it is equal to the predetermined value, such as 1. The UEFI confirms that the user has authorized the calibration and has the proper permissions to do so.

At step 250, the method includes, in response to authorizing, saving a calibration data associated with the calibration indicator, to a secure memory location on the computing device. The UEFI writes the calibration data payload from the calibration data variable to a secure memory location that is readable by the firmware or other component using the calibration data. The secure memory location may be a reserved or protected region of the memory, such as a non-volatile memory, a flash memory, or a trusted platform module. The UEFI may also encrypt, sign, or authenticate the calibration data payload before writing it to the secure memory location to ensure its integrity and validity.

The UEFI may clear the flag variable and the calibration data variable, or sets them to a different value, such as 0, to indicate that the calibration has been completed and to prevent any further or repeated calibration. The UEFI may also erase or overwrite the stored UID to prevent any comparison or detection of the component replacement in the future. In an aspect, the user performing the hardware replacement may use the UEFI interface to update flag variable. In an aspect, the "completion" check is done by validating that the new calibration data is saved correctly and usable by the hardware. Upon validation, the user may reset the flag variable. The flag indicates that from the user point of view the system is in a "replacement" mode. It may be the job of the user to exit this mode.

The UEFI continues the boot process and transfers the control to the operating system or the firmware. The firmware reads the calibration data payload from the secure memory location and applies it to the component. The firmware calibrates the component according to the calibration data payload and enables the component's functionality, accuracy, or quality. The new calibration data may replace factory calibration data stored on the computing device during the build process. In aspects, the firmware may perform a validation on the new calibration data. For example, the firmware may determine that the calibration data is within allowed ranges, in a correct format, and the like. In aspects, the calibration data may take the form of a .icc file.

FIG. 3 is a flow diagram showing a method 300 using an encrypted computational graph, in accordance with some embodiments of the present disclosure. Method 300 may be performed on or with systems similar to those described with reference to FIG. 1.

At step 310, the method 300 includes booting, by a boot manager, a computing device to activate a first runtime session. The technology described herein may operate within a boot manager or other application on the computing device. The boot manager or other software may be given write access to the secure memory where the factory calibration data is stored. In examples described herein, the boot manager may be the Unified Extensible Firmware Interface (UEFI), which is a software interface between the operating system and the platform firmware.

At step 320, the method 300 includes receiving, at the boot manager during the first runtime session, an instruction to set a calibration indicator to an active status. The calibration indicator may be set through a boot manager utility interface. The calibration indicator may be a flag in a designated field of the software, such as a UEFI shell, a UEFI application, or a UEFI utility, performing the data update. Initially, a user sets the calibration indicator to a predetermined value, such as 1. The calibration indicator may be a NVRAM variable. The calibration indicator acts as a signal for the UEFI and the firmware associated with the hardware component being replaced that the user wants to calibrate the component and has the necessary permissions to do so. At step 330, the method 300 includes setting, at the boot manager during the first runtime session, the calibration indicator of a calibration field to active.

At step 340, the method 300 includes receiving, at the boot manager during the first runtime session, calibration data for a hardware component. The user associates the calibration data variable, which may be a NVRAM variable, in the software performing the update with the data payload for the calibration, such as the desired parameters, settings, or values for the component. Again, the calibration data may be provided through a user interface associated with the boot manager. The calibration data variable may have a predefined name, format, or size, or may be specified by the user. The calibration data variable may be encrypted, signed, or authenticated by the user or the UEFI to ensure its integrity and validity.

At step 350, the method 300 includes subsequent to the first runtime session ending, initiating a boot cycle at the computing device, by the boot manager, to activate a second runtime session. This may be through an instruction, such as to restart the computing device. This could also occur when the computer is shut down and restarted.

At step 360, the method 300 includes reading, at the boot manager during the boot cycle, a unique identifier (UID) from a hardware component of a first hardware type installed in the computing device. At step 370, the method 300 includes identifying, at the boot manager during the boot cycle, a mismatch between the UID and a stored UID for the first hardware type. The boot process performed by the boot manager may look for a UID mismatch. When no UID mismatch occurs, then the boot process proceeds normally without updating the calibration data. However, when a mismatch is identified, the boot manager may take further steps to determine whether a calibration data update should occur. The further steps may include determining whether a calibration indicator associated with the hardware component in which the mismatch was found is active.

At step 380, the method 300 includes upon detecting the calibration indicator has an active status and the mismatch, authorizing, at the boot manager during the boot cycle, a calibration data update. At step 390, the method 300 includes, in response to authorizing, saving, by the boot manager during the boot cycle, the calibration data, to a secure memory location on the computing device. Each hardware component may have calibration data stored in a specific place in secure memory. The boot manager may delete previous calibration data and replace it with new calibration data. In aspects, this secure memory location may be read by the hardware's firmware and provided to the operating system during the boot process. In other aspects, the operating system is able to read the secure memory directly. The calibration data may replace factory calibration data stored on the computing device during the build process. In aspects, the calibration data may take the form of an .icc file.

FIG. 4 is a flow diagram showing a method 400 using an encrypted computational graph, in accordance with some embodiments of the present disclosure. Method 400 may be performed on or with systems similar to those described with reference to FIG. 1.

At step 410, the method 400 includes replacing an old hardware component of a computing device with a new hardware component. The user replaces the hardware component with a new one that has a different UID from the previous one. The user may use a physical tool, such as a screwdriver, a plier, or a soldering iron, to remove the old component and install the new one. The user may also use a software tool, such as a firmware update utility, to change the UID of the component without physically replacing it. Next, the user resets the device, such as by pressing a reset button, unplugging and plugging the power cord, or issuing a reboot command. The device initiates the boot process and loads the UEFI.

At step 420, the method 400 includes performing a field calibration of the new hardware component to generate calibration data. Field calibration may use various tools. For example, when calibrating a screen a calibrated tristimulus colorimeter may be used. It measures color accuracy by analyzing the light emitted from the screen. The colorimeter and/or other calibration equipment generates data that may be used to build and/or modify an ICC profile (software-based calibration) to adjust the monitor's output. In an aspect, a color sensor may be used for calibration. The color sensor provides data about red, green, and blue wave lengths. The ICC profile may adjust various settings. The ICC profile may adjust gamma settings to achieve the correct balance between dark and light tones. The ICC profile may fine-tune brightness and contrast for optimal visibility without sacrificing detail. The ICC profile may achieve accurate color reproduction by adjusting red, green, and blue channels. The ICC profile may optimize text rendering for readability (ClearType Text for Windows).

At step 430, the method 400 includes providing, to a boot manager, an instruction to activate a calibration indicator. At step 440, the method 400 includes providing, to the boot manager, the calibration data for the new hardware component. At step 450, the method 400 includes causing the computing device to boot.

Example Operating Environment

Figure 5:
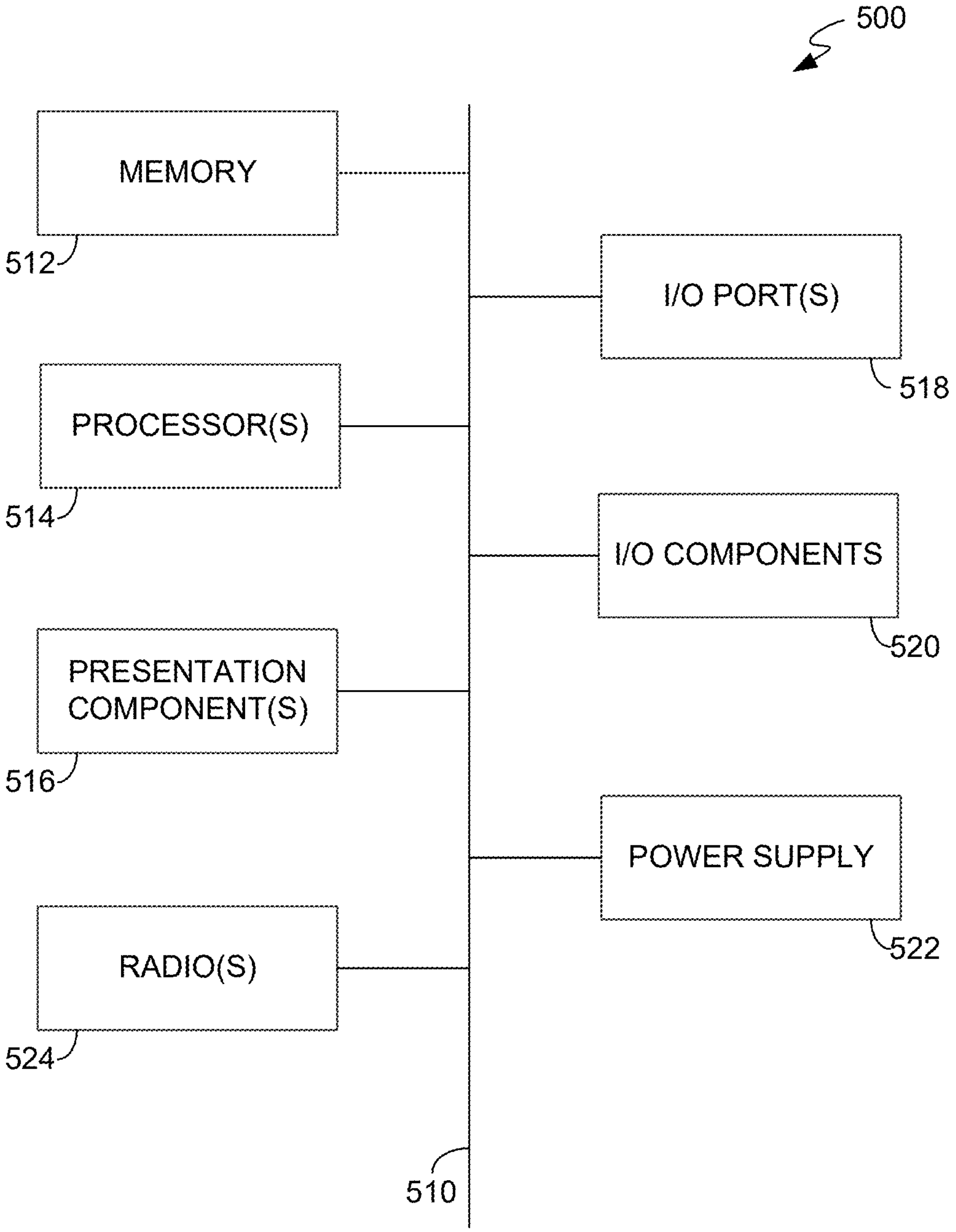
FIG. 5 is a block diagram showing a computing device suitable for implementations of the technology described herein.

Referring to the drawings in general, and initially to FIG. 5 in particular, an example operating environment for implementing aspects of the technology described herein is shown and designated generally as computing device 500. Computing device 500 is but one example of a suitable computing environment and is not intended to suggest any limitation as to the scope of use of the technology described herein. Neither should the computing device 500 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 5, computing device 500 includes a bus 510 that directly or indirectly couples the following devices: memory 512, one or more processors 514, one or more presentation components 516, input/output (I/O) ports 518, I/O components 520, and an illustrative power supply 522. Bus 510 represents what may be one or more busses (such as an address bus, data bus, or a combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 5 is merely illustrative of a computing device that may be used in connection with one or more aspects of the technology described herein. Distinction is not made between such categories as “workstation,” “server,” “laptop,” “handheld device,” etc., as all are contemplated within the scope of FIG. 5 and refer to “computer” or “computing device.”

Computing device 500 typically includes a variety of computer-readable media. Computer-readable media may be any available media that may be accessed by computing device 500 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 512 includes computer storage media in the form of volatile and/or nonvolatile memory. The memory 512 may be removable, non-removable, or a combination thereof. Example memory includes solid-state memory, hard drives, optical-disc drives, etc. Computing device 500 includes one or more processors 514 that read data from various entities such as bus 510, memory 512, or I/O components 520. Presentation component(s) 516 present data indications to a user or other device. Example presentation components 516 include a display device, speaker, printing component, vibrating component, etc. I/O ports 518 allow computing device 500 to be logically coupled to other devices, including I/O components 520, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 514 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 500. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

A computing device may include a radio 524. The radio 524 transmits and receives radio communications. The computing device may be a wireless terminal adapted to receive communications and media over various wireless networks.

Computing device 500 may communicate via wireless policies, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 policies.

EMBODIMENTS

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. One or more computer storage media comprising computer-executable instructions that when executed by a computing device performs a method of providing calibration data for a hardware component to the computing device, the method comprising:

detecting, at the computing device, a calibration indicator with an active status;

reading, at the computing device, a unique identifier (UID) from a hardware component of a first hardware type installed in the computing device;

identifying, at the computing device, a mismatch between the UID and a stored UID for the first hardware type, wherein the stored UID is for a hardware component of the first hardware type that has been removed from the computing device;

upon detecting the calibration indicator has an active status and the mismatch, authorizing a calibration data update; and in response to authorizing, saving a calibration data associated with the calibration indicator to a secure memory location on the computing device.

2. The media of claim 1, wherein the method further comprises resetting the calibration indicator to an inactive status.

3. The media of claim 1, wherein the secure memory location is readable by a firmware responsible for facilitating one or more functions of the hardware component.

4. The media of claim 1, wherein the method further comprises authenticating the calibration data prior to saving the calibration data.

5. The media of claim 1, wherein the calibration data is generated from a field calibration.

6. The media of claim 1, wherein the secure memory is one of a non-volatile memory, a flash memory, and a trusted platform module.

7. The media of claim 1, wherein the hardware component is one of a screen, a camera, a speaker, and a microphone.

8. A method of providing calibration data for a hardware component to a computing device, comprising:

booting, by a boot manager, the computing device to activate a first runtime session;

receiving, at the boot manager during the first runtime session, an instruction to set a calibration indicator to an active status;

setting, at the boot manager during the first runtime session, the calibration indicator of a calibration field to active;

receiving, at the boot manager during the first runtime session, calibration data for the hardware component;

subsequent to the first runtime session ending, initiating a boot cycle at the computing device, by the boot manager, to activate a second runtime session;

reading, at the boot manager during the boot cycle, a unique identifier (UID) from a hardware component of a first hardware type installed in the computing device;

identifying, at the boot manager during the boot cycle, a mismatch between the UID and a stored UID for the first hardware type;

upon detecting the calibration indicator has an active status and the mismatch, authorizing, at the boot manager during the boot cycle, a calibration data update; and in response to authorizing, saving, by the boot manager during the boot cycle, the calibration data to a secure memory location on the computing device.

9. The method of claim 8, wherein the method further comprises, subsequent to the saving, setting, at the boot manager during the boot cycle, the calibration indicator to inactive.

10. The method of claim 8, wherein the calibration data is generated from a field calibration.

11. The method of claim 8, wherein the instruction to activate the calibration indicator is received through a boot utility.

12. The method of claim 8, wherein the secure memory is one of a non-volatile memory, a flash memory, and a trusted platform module.

13. The method of claim 8, wherein the method further comprises replacing the stored UID with the UID from the hardware component.

14. The method of claim 8, wherein the method further comprises firmware associated with the hardware component reading the calibration data and applying the calibration data to the hardware component.

15. The method of claim 8, wherein the computing device is in user mode when the calibration data is received.

16. The method of claim 8, wherein the method further comprises authenticating the calibration data prior to saving the calibration data.

17. One or more computer storage media comprising computer-executable instructions that when executed by a computing device performs a method of providing calibration data for a hardware component to the computing device, the method comprising:

detecting, at the computing device, a calibration indicator with an active status;

reading, at the computing device, a unique identifier (UID) from a hardware component of a first hardware type installed in the computing device;

identifying, at the computing device, a mismatch between the UID and a stored UID for the first hardware type, wherein the stored UID is for a hardware component of the first hardware type that has been removed from the computing device;

upon detecting the calibration indicator has an active status and the mismatch, authorizing a calibration data update; and in response to authorizing, saving a calibration data associated with the calibration indicator to a secure memory location on the computing device, wherein the secure memory location is readable by a firmware responsible for facilitating one or more functions of the hardware component.

18. The media of claim 17, wherein the method further comprises resetting the calibration indicator to an inactive status.

19. The media of claim 17, wherein the method further comprises authenticating the calibration data prior to saving the calibration data, and wherein the calibration data is generated from a field calibration.

* * * * *